(12) United States Patent
Brossette et al.

(10) Patent No.: US 6,574,583 B1
(45) Date of Patent: *Jun. 3, 2003

(54) METHOD FOR ANALYZING SETS OF TEMPORAL DATA

(75) Inventors: Stephen E. Brossette, Birmingham, AL (US); Stephen A. Moser, Mountain Brook, AL (US); Alan P. Sprague, Columbus, OH (US); Michael J. Hardin, Alabaster, AL (US); Warren T. Jones, Birmingham, AL (US)

(73) Assignee: UAB Research Foundation, Birmingham, AL (US)

( * ) Notice: Subject to any disclaimer, the term of this patent is extended or adjusted under 35 U.S.C. 154(b) by 391 days.

This patent is subject to a terminal disclaimer.

(21) Appl. No.: 09/679,676

(22) Filed: Oct. 5, 2000

Related U.S. Application Data

(63) Continuation-in-part of application No. 09/554,359, filed as application No. PCT/US98/24096 on Nov. 12, 1998.
(60) Provisional application No. 60/065,357, filed on Nov. 12, 1997.

(51) Int. Cl.[7] ............................................. G06F 15/177
(52) U.S. Cl. ............................. 702/179; 707/6; 707/200
(58) Field of Search .............................. 702/179; 707/2, 707/6, 102, 200; 706/45, 50; 209/242, 244; 345/841, 864

(56) References Cited

U.S. PATENT DOCUMENTS

| | | | | |
|---|---|---|---|---|
| 5,440,738 A | * | 8/1995 | Bowman et al. | 707/6 |
| 5,590,325 A | | 12/1996 | Kolton et al. | 707/6 |
| 5,893,910 A | * | 4/1999 | Martineau et al. | 707/10 |
| 6,105,025 A | * | 8/2000 | Jacobs et al. | 707/8 |
| 6,192,358 B1 | * | 2/2001 | Fuh et al. | 707/4 |
| 6,253,196 B1 | * | 6/2001 | Fuh et al. | 707/3 |
| 6,389,425 B1 | * | 5/2002 | DeMichiel et al. | 707/102 |
| 6,393,409 B2 | * | 5/2002 | Young et al. | 705/37 |

* cited by examiner

*Primary Examiner*—Kamini Shah
(74) *Attorney, Agent, or Firm*—Gifford, Krass, Groh, Sprinkle, Anderson & Citkowski, P.C.

(57) ABSTRACT

A method for analyzing sets of temporal data using a computer is described. Each set of temporal data includes a plurality of records collected at a time unique to each such set and in which each record has a plurality of data items. The method includes the first step of creating data association rules for at least a plurality of sequential data sets wherein each association rule describes data items that are found together in some data records. An incidence proportion is then determined for each such association rule for each temporal data set and these incidence proportions are stored. The incidence proportions for each association rule are grouped into two aggregate proportions by a user defined window schedule that describes one or more pairs of a current window $w_c$ and a past window $w_p$. The cumulative incidence proportions for each association rule for each past window $w_p$ are compared with the cumulative incidence proportion for the corresponding current window $w_c$ by a statistical test of two proportions. When the cumulative incidence proportion of the current window $w_c$ differs significantly from the corresponding cumulative incidence proportion of the past window $w_p$, an event is generated. From the set of events generated, alerts are generated using a method called event capture. These alerts are presented to the user.

6 Claims, 2 Drawing Sheets

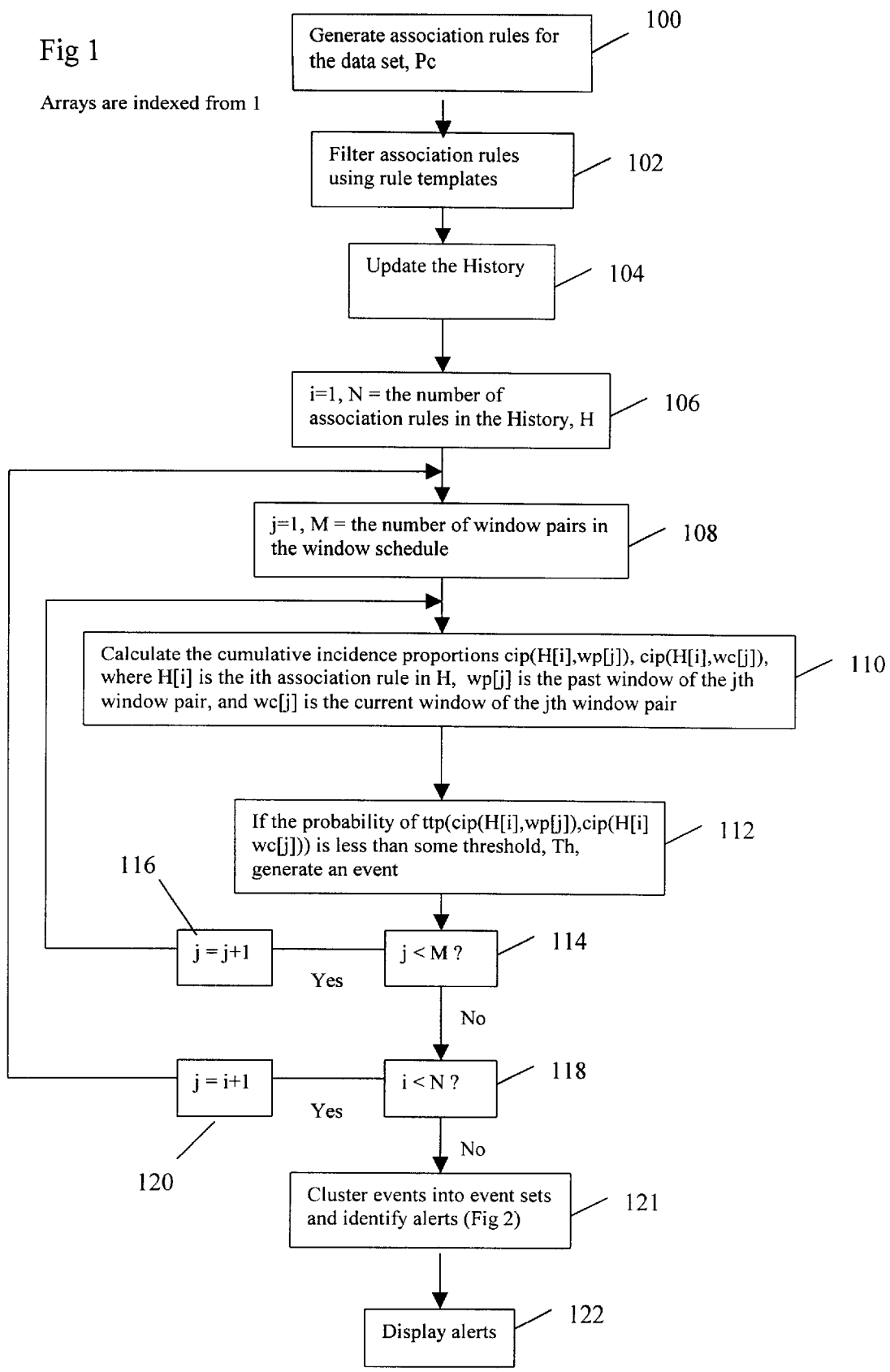

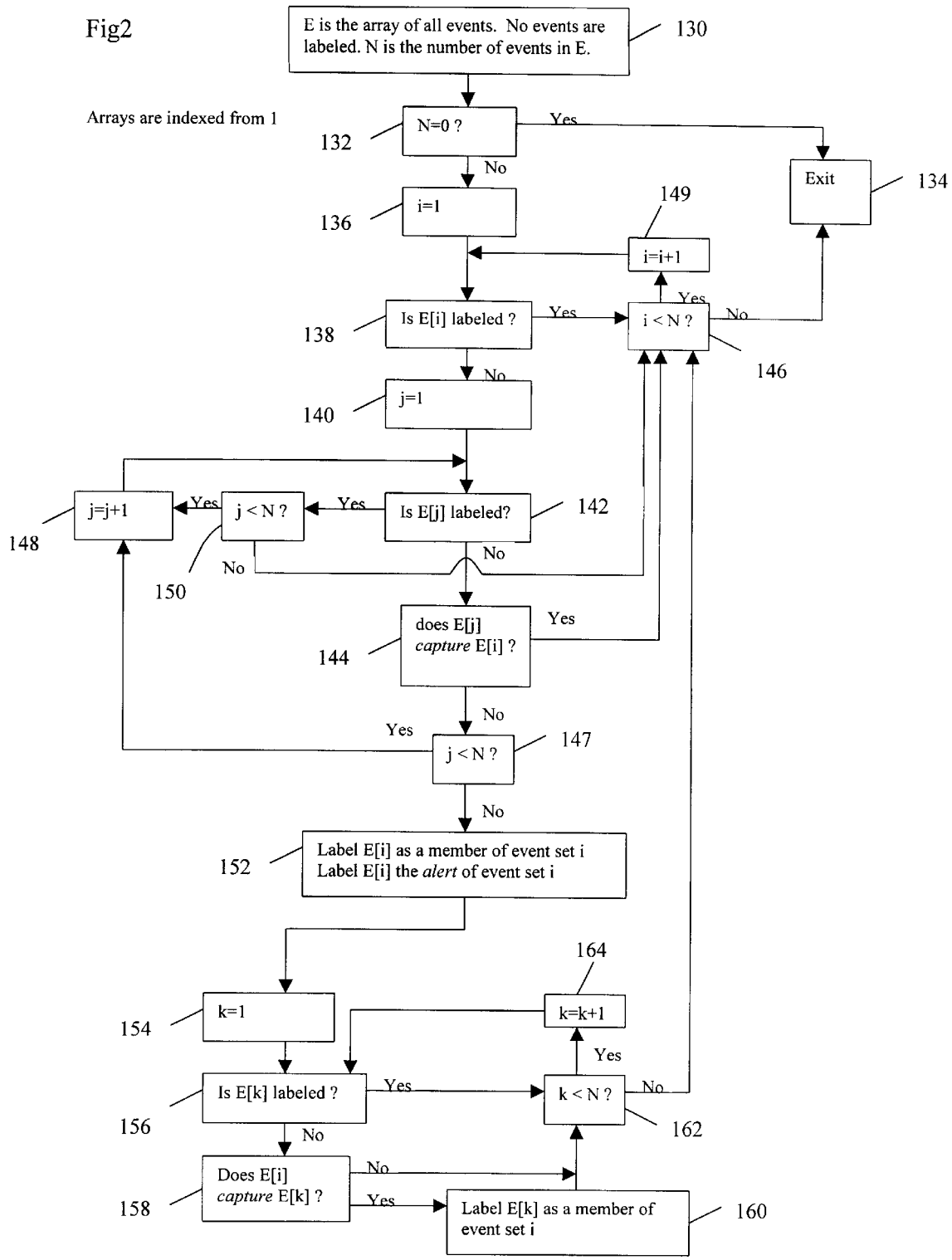

METHOD FOR ANALYZING SETS OF TEMPORAL DATA

CROSS-REFERENCE TO RELATED APPLICATION

This application is a continuation-in-part of patent application Ser. No. 09/554,359, filed May 12, 2000, entitled "Method for Analyzing Sets of Temporal Data", which is a 371 of PCT/US98/24096 filed Nov. 12, 1998, which claims the benefit of provisional application 60/065,357 filed Nov. 12, 1997.

BACKGROUND OF THE INVENTION

I. Field of the Invention

The present invention relates generally to a data analysis computer program and, more particularly, to a data analysis program for analyzing sets of temporal data such as temporal health care surveillance data, and especially epidemiological data related to antimicrobial resistance and nosocomial infections.

II. Description of the Prior Art

There are many health care databases, e.g. epidemiology databases and hospital databases containing temporal data, i.e. data which is collected over time and can be grouped by time intervals. Such databases, furthermore, typically include bacterial antimicrobial resistance/susceptibility data, and related patient clinical and demographic data at hospital, regional, and national levels. Domain experts in epidemiology and laboratory medicine currently review this data by performing manual analysis in an effort to discover significant new patterns, information and trends of the data, especially those related to outbreaks of nosocomial and community-acquired infections, and significant changes in antimicrobial resistance of microorganisms. Such manual analysis includes database queries and confirmatory statistics to specific questions in an effort to test specific hypotheses. These traditional methods of data analysis, however, offer no way to discover patterns and trends that are not suspected by the investigators of the data. Consequently, such unsuspected trends and patterns are often ignored and remain undiscovered even though such trends and patterns may be significant. The inefficiency of this process results in the non-discovery or late discovery of patterns and trends that result in increased patient morbidity and mortality and increased cost of medical treatment due to preventable adverse outcomes.

SUMMARY OF THE PRESENT INVENTION

The present invention provides a method for analyzing sets of temporal data, especially epidemiological data and hospital data, to automatically identify significant trends and patterns in the data in a timely fashion.

In brief, the method of the present invention analyzes sets of temporal data wherein each set of temporal data comprises a plurality of records collected during a time period unique to each such set. Each record has a plurality of data items including, for example, patient characteristics, specimen source, date obtained, test performed, results obtained, organisms isolated, location of patient in the healthcare facility, date the patient was admitted to the facility, patient clinical data, and one or more antimicrobials used to test the isolated organism against.

The method of the present invention includes the first step of creating data association rules for at least a plurality of sequential data sets, i.e. sequential temporal data sets, wherein each such data set includes at least some common data items. Each data association rule is further compared to user defined rule templates to differentiate between interesting or significant rules and uninteresting or insignificant rules. The templates may be either "include" or "exclude" templates, as described below.

The incidence proportion of each association rule is computed for the current data set analyzed as well as for previous data sets, i.e. those data sets that contain data from earlier times. The incidence proportion of an association rule A→B in data set $p_i$ is the number of times outcome B occurs in group A in time $t_i$. Consequently, a series of incidence proportions for A→B from data sets $p_1, p_2, \ldots, p_n$ describes the incidence of the outcome B in group A from $t_1$ through $t_n$. Therefore, by analyzing the time-series of incidence proportions of an association rule A→B from a temporal set of data sets, it is possible to detect shifts or trends in the incidence of B in A over time.

An event describes an interesting change in the temporal series of incidence proportions of an association rule. In order to determine such events, the temporal set of incidence proportions of an association rule are divided into user-defined windows, namely the past window, $w_p$, and the current window, $w_c$, and a cumulative incidence proportion is computed for each window. $w_p$ and $w_c$ are defined in the windowing schedule. Each entry in the windowing schedule is defined by the user and comprises a window pair $wp_p, wp_c$ where $wp_p$ describes the data sets in the past window $w_p$ and $wp_c$ describes the data sets in the current window $w_c$. For each association rule, each window $w_p$ and $w_c$, furthermore, contains at least one set of temporal data.

The cumulative incidence proportion is computed for a time window ($w_p$ or $w_c$) for an association rule by summing one or more incidence proportions in the time window. The cumulative incidence proportion of an association rule r=A→B in a time window w is $$cip(r, w) = \frac{\sum_{p_i \in w} sup(A \cup B, p_i)}{\sum_{p_i \in w} sup(A, p_i)}$$

Simply stated, the numerator of the cumulative incidence proportion is the sum of the numerators of all incidence proportions in w, and the denominator is the sum of the denominators of all incidence proportions in w.

A change in the cumulative incidence proportion of a particular association rule between $w_p$ and $w_c$, such that the probability that the change occurred by chance is less than some predefined percentage (e.g. 5%) as determined by a chi-square test of two proportions or some other applicable statistical test, generates an event. Following the generation of events, the clustering of events by event capture generates event sets, each with an alert. Alerts are presented to the operator.

In the preferred embodiment of the invention, the number of events presented to the operator is reduced by event capture.

A primary advantage of the present invention is that it rapidly identifies alerts consisting of high support association rules whose cumulative incidence proportions change significantly over time. Using traditional methods, these alerts might be overlooked. Additionally, these alerts are a selected subset of all events, thereby focusing information presentation to the operator.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a flow chart illustrating a portion of the preferred embodiment of the present invention; and FIG. 2 is a flow chart illustrating another portion of the preferred embodiment of the present invention.

DETAILED DESCRIPTION OF A PREFERRED EMBODIMENT OF THE PRESENT INVENTION

The entire disclosure of the parent application is hereby incorporated by reference.

Temporal health care data can be collected in data sets, each data set P representing a plurality of individual records where n is the total number of records in the data set. Each individual record, in turn contains data items a, b, c etc. An item is a discrete element found in a data set. An item set x is a subset of the set of all items in the data set. The support of item set x, sup(x), is the number of records in a data set that contain x. If sup(x)≧FSST (the frequent set support threshold), x is a frequent set. For each data set, frequent sets with support greater than some user-defined threshold, FSST, are generated. An association rule, A→B, where A and B are frequent sets and A∩B=∅, is a statement about how often the items of B are found in records with the items of A. The incidence of B in A, or the incidence proportion of A→B, is denoted ip(A→B), and is equal to sup(A∪B)/sup(A). The precondition support of association rule A→B is sup(A), the denominator of the incidence proportion. Using conventional methods, for each frequent set generated from a data set, all association rules with a precondition support greater or equal to a preset value,, the precondition support threshold (PST), are generated. These are called high support association rules. Each association rule generated is compared to a set of user-defined rule templates that describe interesting and uninteresting rules. Each rule template is of the form $be_1 \rightarrow be_2$ where $be_1$ and $be_2$ are Boolean expressions over items and attributes. Association rule A→B satisfies rule template $be_1 \rightarrow be_2$ if A satisfies be1 and B satisfies be2. Two types of rule templates are used: include templates and exclude templates. An association rule A→B passes a set of templates if it satisfies at least one include template in the set and does not satisfy any exclude template in the set. Any number of include and exclude templates can be specified.

Once the association rules have been determined for a data set P, an incidence proportion ip(R) is then determined for each association rule R in P. For example, assuming association rule R=A→B has sufficient support in P, i.e. sup(A) is greater PST, and the items in B occur in 60 of 100 of the data records of P that contain the items of A, then the incidence proportion of B given A, ip(A=>B), is $60/100$.

Any conventional means may be utilized to identify and create the association rules, ensure that the association rules have sufficient precondition support as well as calculate the incidence proportion ip(R) for each association rule R in the entire data set P.

For a data set P, association rules that pass rule templates are stored in a database called the history, H. To establish a baseline for each new association rule discovered in P, the incidence proportions of the rule for previous data sets are obtained and stored in H. Once a rule is stored in H, it is updated for each new data set processed regardless of whether or not it is generated in the data set. Therefore, the history has an up-to-date time-series of incidence proportions for every association rule it contains.

According to the present invention and as will be shortly described in greater detail, for each association rule, incidence proportions are aggregated into one ore more sets of two user-defined windows, the current window $w_c$ and the past window $w_p$, wherein each window describes at least one set of temporal data from which there is one incidence proportion for each association rule. The cumulative incidence proportion cip(R) for the current window $w_c$ is then compared with the corresponding cumulative incidence proportion cip(R) for past window $w_p$. When the change between cumulative incidence proportions of a particular association rule is statistically significant, e.g. p=0.05 as determined by a chi-square test of two proportions or some other applicable statistical test, an event signal is created and stored. Following the analysis of all association rules in H for all window pairs in the windowing schedule, the event signals are grouped into event sets by event capture. Association rule A1=>$B_1$ is a descendent of rule A2=>B2 if A1 contains A2 and B1 contains B2, A1=>B1 not equal to A2=>B2. For any two events x and y, x is said to capture (event capture) y if the association rule of x, $A_x \rightarrow B_x$, is a descendent of the association rule of y, $A_y \rightarrow B_y$, $(w_p, w_c)$ of x is equal to $(w_p, w_c)$ of y, and the result of the test of two proportions (ttp):

$$ttp\left(\frac{sup(Ay \cup By, w_p) - sup(Ax \cup Bx, w_p)}{sup(Ay, w_p)}, \frac{sup(Ay \cup By, w_c) - sup(Ax \cup Bx, w_c)}{sup(Ay, w_c)}\right)$$

is greater than α, an arbitrary statistical value selected to represent an interesting or significant change in data from the test of two proportions equation.

An event set x' is the event x, called the alert of x', and all events that x captures. After creating event sets, each event is a member of an event set—some containing only one event, the alert itself, others many events, only one of which is the alert. Since the alert of an event set contains all pertinent information for the entire set, only alerts are presented to the user; all other events are redundant. This greatly reduces the number of events for the operator to review.

FIG. 1 depicts a flow chart illustrating the overall operation of the method of the present invention. At step 100, association rules with high precondition support for the data contained in the data set $P_c$ are generated from frequent sets generated from $P_c$. Frequent set discovery and association rule generating algorithms are well known, and any conventional such frequent set discovery and rule generating algorithm may be utilized.

Following the generation of the association rules at step 100, step 100 branches to step 102 in which each association rule generated at step 100 is compared, as described above, to a set of user defined rule templates designed to segregate uninteresting rules from interesting rules. All association rules other than those that satisfy any include rule template and do not satisfy any exclude rule template are disregarded. Step 102 then branches to step 104. At step 104 the history, H, is updated. Only association rules that pass the rule templates are stored in H. The incidence proportions in $P_c$ of rules generated are stored in H. To establish a baseline for each new association rule, i.e. one not stored in H before the analysis of $P_c$, the incidence proportions of the rule for previous data sets are obtained and stored in H. Once a rule is stored in H, it is updated for each additional data set analyzed regardless of whether or not it is generated in the data set.

Step 104 then branches to step 106 where the iterator i is set to 1 and the constant N is set to the number of association rules in the history, H. Step 106 then branches to step 108.

At step 108, the iterator j is set to 1 and the constant M is set to the number of window pairs in the window schedule. Step 108 then branches to step 110.

At step 110, the cumulative incidence proportions cip(H[i],wp[j]) and cip(H[i],wc[j]) are calculated, where H[i] is the ith association rule in H, wp[j] is the past window of the jth window pair in the window schedule, and wc[j] is the current window of the jth window pair. Step 110 then branches to step 112.

At step 112, the program utilizing a statistical test of two proportions (ttp) determines if the cumulative incidence proportion for H[i] for the current window $w_c[j]$ is significantly different than the corresponding cumulative incidence proportion for H[i] for the past window $w_p[j]$. If so, an event is generated and stored. Step 112 then branches to step 114. At step 114, the program determines if all of the window pairs M have been analyzed. If so, step 114 branches to step 116 where the iterator j is incremented and steps 110 and 112 are repeated. Conversely, if the iterator j is equal to the number of window pairs M, step 114 instead branches to step 118 where the iterator i is compared to the number of association rules N in the history H. If i is less than N, indicative that additional association rules remain to be analyzed, step 118 branches to step 120 where the iterator j is incremented and steps 108–114 are reiterated until all the association rules have been analyzed.

Once all of the association rules have been analyzed, i equals N and step 118 branches to step 121 in which the events are clustered into event sets utilizing the event capture method discussed below. Step 121 then branches to step 122 where the alerts are displayed to the user.

With reference now to FIG. 2, a flow chart illustrating the method for clustering events into event sets (event capture) and thereby identifying alerts (step 120 in FIG. 1) is there shown. At step 130, E represents the array of all events where N represents the number of events in E. None of the events are labeled at step 130. Step 130 then branches to step 132. At step 132, the program first tests to determine if the number of events N in the array of events E is equal to 0. If so, step 132 branches to step 134 and exits the program. Otherwise, 132 branches to step 136 where the iterator I is set to 1 and step 136 then branches to step 138.

At step 138, the program determines if the event E[i] is labeled. If not (which will always occur the first time), step 138 branches to step 140 where the iterator j is set to 1 and step 140 then branches to step 142.

At step 142, the program determines if the event E[j] is labeled. Assuming that E[j] is unlabeled, step 142 branches to step 144 which determines if the event E[j] captures the event E[i]. If so, step 144 branches to step 146 which determines if all of the events E have been analyzed. If so, step 146 branches to step 134 and exits. Otherwise, step 146 branches to step 149 where the iterator i is incremented and step 149 then branches to step 138 where the above process is repeated.

Conversely, if the event E[j] does not capture the event E[i], step 144 instead branches to step 147 which compares the iterator j with the number of events N in the array of events E. If j is less than N, indicative that more data needs to be analyzed, step 147 branches to step 148 where the iterator j is incremented and step 148 then branches to step 142 where the above process is repeated.

Assuming that the event E[j] is already labeled at step 142, it is unnecessary to determine if event E[j] captures event E[i]. In this event, step 142 branches to step 150 where the iterator j is compared with the number of events N in the array of events E. If j is less than N, step 150 branches to step 148 and then again to step 142 where the above process is repeated. Otherwise, step 150 branches to step 146 where processing dependent upon the value of the iterator i is determined as has been previously described. The steps described to this point, specifically steps 138 to 150, determine in part whether or not unlabeled event i, E[i], is captured by any other event in E. If E[i] is captured by at least one other event, then it is not a member of event set i. If E[i] is not captured, then it is a member of event set i and is the alert of event set i, as described next.

Assuming that at step 147 j equals N, indicative that a complete pass of all of the events in the array of events E for the iterator j have been completed and E[i] was not captured by any other unlabeled event in E, step 147 branches to step 152 where the event E[i] is labeled both as a member of the event set i as well as the alert of the event set i. Step 152 then branches to step 154 where the iterator k is set to 1 and step 154 then branches to step 156.

At step 156, the program determines if the event E[k] is labeled. If not, step 156 branches to step 158 which determines if the event E[i] captures the event E[k]. If so, step 158 branches to step 160 where event E[k] is labeled as a member of the event set i and step 160 then branches to step 162. Conversely, if event E[i] does not capture event E[k], step 158 instead branches directly to step 162 where the iterator k is compared with the number of events N. If k is less than N, step 162 branches to step 164 where the iterator k is incremented and step 164 then branches back to step 156.

Conversely, if the event E[k] is already labeled at step 156, it is unnecessary to determine if event E[i] captures event E[k]. Consequently, step 156 in that case branches directly to step 162. Steps 154–164 find and label those unlabeled events in E that E[i] captures.

After all of the events have been analyzed utilizing the iterator k, step 162 branches to step 146 where the program proceeds as previously described.

Consequently, as can be seen from FIG. 2, the event capture algorithm reduces the number of events into a smaller number of event sets, each with one alert. Since the alert of an event contains all pertinent information for the entire set, only alerts are presented to the user since all other events are redundant. This in turn reduces the number of patterns for the user to review.

From the foregoing, it can be seen that the present invention provides a novel method of analyzing temporal data such as the type of data used in health care surveillance. No unnecessary limitation, however, should be drawn therefrom since the data analysis method of the present invention may be used for any type of temporal data.

Having described my invention, however, many modifications thereto will become apparent to those skilled in the art to which it pertains without deviation from the spirit of the invention as defined by the scope of the appended claims.

We claim:

1. A method for analyzing sets of temporal data, each data set of temporal data comprising a plurality of records collected at a time period unique to each said set, each record having a plurality of data items, said method comprising the steps of:

creating data association rules for at least two sequential data sets, each association rule representing data records having at least some common data items, determining the cumulative incidence proportion for each such association rule over one or more data sets, storing said association rules and said incidence proportions for said at least two sequential data sets, comparing said cumulative incidence proportion for each association rule for selected data sets with cumulative incidence proportion for other data sets, generating an event signal whenever, for each association rule, the cumulative incidence proportion changes significantly over data sets as determined by a statistical test of two proportions.

2. The invention as defined in claim 1 wherein each data window comprises at least one data set.

3. The invention as defined in claim 1 wherein said creating data association rules step further comprises the step of creating said data association rules only when the precondition support threshold exceeds a preset number.

4. The invention as defined in claim 1 wherein said data set comprises health care data.

5. The invention as defined in claim 1 and comprising the further step of generating alert signals by clustering said event signals by event capture to eliminate redundant events.

6. The invention as defined in claim 1 and comprising the step of applying rule templates to said association rules and disregarding association rules which do not meet said template(s).

* * * * *